United States Patent [19]

Janssen et al.

[11] 4,310,372
[45] Jan. 12, 1982

[54] METHOD OF MAKING A WELL SCREEN

[75] Inventors: Kermit W. Janssen, Valley Forge, Pa.; Andrew Mitchell, Pompano Beach, Fla.

[73] Assignee: Certain-Teed Corporation, Valley Forge, Pa.

[21] Appl. No.: 31,522

[22] Filed: Apr. 19, 1979

[51] Int. Cl.$^3$ .............................................. B29C 27/02
[52] U.S. Cl. .................... 156/245; 156/304.2; 156/305; 156/252; 156/253; 166/227; 166/242; 264/328.1
[58] Field of Search ............... 156/242, 245, 293, 304, 156/305; 166/227, 242; 264/328; 285/419

[56] References Cited

U.S. PATENT DOCUMENTS

| 880,597 | 3/1908 | Syze | 166/242 |
| 1,613,105 | 1/1927 | Helm | 166/242 |
| 1,643,394 | 9/1927 | Smith | 166/227 |
| 1,710,471 | 4/1929 | Cater | 166/46 |
| 2,392,190 | 1/1946 | Ritter | 166/46 |
| 2,980,568 | 4/1961 | Kazmierowicz | 156/293 |
| 3,378,420 | 4/1968 | Dickinson et al. | 156/172 |
| 3,692,607 | 9/1972 | Shubert | 156/175 |
| 4,068,713 | 1/1978 | McGuire | 166/233 |
| 4,097,076 | 6/1978 | Wackenreuther et al. | 285/340 |

FOREIGN PATENT DOCUMENTS 1832265 2/1961 Fed. Rep. of Germany.

Primary Examiner—Caleb Weston
Attorney, Agent, or Firm—John T. Synnestvedt; Albert L. Free

[57] ABSTRACT

Fittings and methods for manufacturing fittings for piping are disclosed. The fittings are assembled from three identical molded pieces joined along longitudinal edges. Interfitting pieces form the joints between the sections and serve to draw the sections together during assembly and ensure roundness of the fitting. The technique is especially useful for the manufacture of fittings such as well screens, of synthetic polymeric materials.

4 Claims, 8 Drawing Figures

METHOD OF MAKING A WELL SCREEN

FIELD OF THE INVENTION

The invention relates to fittings for fluid handling systems and methods for manufacturing such fittings. The invention specifically concerns molded fittings.

BACKGROUND

Although the invention is believed to have applicability for a wide variety of fluid handling systems, primary experience to date has been in the context of well casings. Therefore, the following description will be in that environment.

For many years well casings have been constructed of metal, usually steel. Metal casing systems have several disadvantages. Fittings for securing casing sections together are usually welded on the adjoining end of the pipe sections as an on-site procedure, resulting in the need for several days construction time for most wells. The attendant costs of this procedure are evident. In addition, there is an increased risk of collapse of the uncased parts of the well.

Further, metal casings are subject to corrosion resulting from chemical and electrolytic attack that shorten the life of the casing. It is also believed that these factors render metal casings, even stainless steel parts such as well screens, less resistant to the development of colonies of bacteria that are sometimes present in water wells.

In order to overcome the foregoing disadvantages, the use of casings of synthetic polymeric materials, for example, polyvinyl chloride (PVC), have been proposed. They primarily involve the use of PVC pipe, each section having a bell end into which the leading end of the next successive pipe end is solvent welded. While such casing systems alleviate the problems mentioned above regarding metal casings, there are still construction delays because a significant period of time is necessary for the solvent weld to cure to a sufficient extent so that it will withstand the pull from the weight of the casing already placed in the well.

With respect to well screens, prior designs have been formed from standard plastic pipe sections in which transverse slits are cut by saw blades. These slits are straight-sided and can become clogged with sand particles that wedge themselves in the slits. Further, the slits are cut from the outside of the pipe inwardly by circular blades, and thus the flow cross-section area of the screen per unit length is restricted, because of the material that must be left at the ends of each slit by the blade.

One attempt to overcome these drawbacks is a metal well screen comprising keystone wire wound on longitudinally extending support rods, as shown in U.S. Pat. No. 3,816,894. Similar well screens of plastic materials, in which a plastic wire is wound on an extruded core having raised sections are shown in U.S. Pat. Nos. 3,378,420 and 4,068,713. While these constructions achieve an efficient screen design, the wire is very easily knocked loose from the support rods or cores when the screen is lowered into the well or when the screen is cleaned, for example, by rotational jet cleaning that directs a high velocity jet of cleaning fluid outwardly from the interior of the screen. In addition, manufacturing costs are quite high.

SUMMARY OF THE INVENTION

It is an object of the invention to provide molded pipe fittings that are strong yet of economical manufacture.

It is an object of the invention to provide fittings for assembling well casings wholly of synthetic polymeric materials.

It is also an object of the invention to provide molded plastic well screens of rugged construction, that yield high flow rates per unit of length and that can be fabricated at low cost.

These objects are achieved by constructing fittings and well screens of three injection molded sections that are identical, each extending substantially 120° in transverse directions. The side surfaces of each section are provided with complementary interfitting means that ensure the roundness of the body of the fitting or well screen and that aid in drawing the joined surfaces together. The interfitting means are designed to allow deflection of at least a portion thereof to achieve a snug fit. Well screen sections are injection molded. The sections include radial and longitudinal ribs covered by a thin exterior skin. The sections are designed so that they can be made in a simple two-part mold. Well screens having a variety of aperture sizes can be made without the need for different mold parts by cutting slits of predetermined width through the thin exterior skin.

DESCRIPTION OF THE PREFERRED EMBODIMENT

Figure 1:
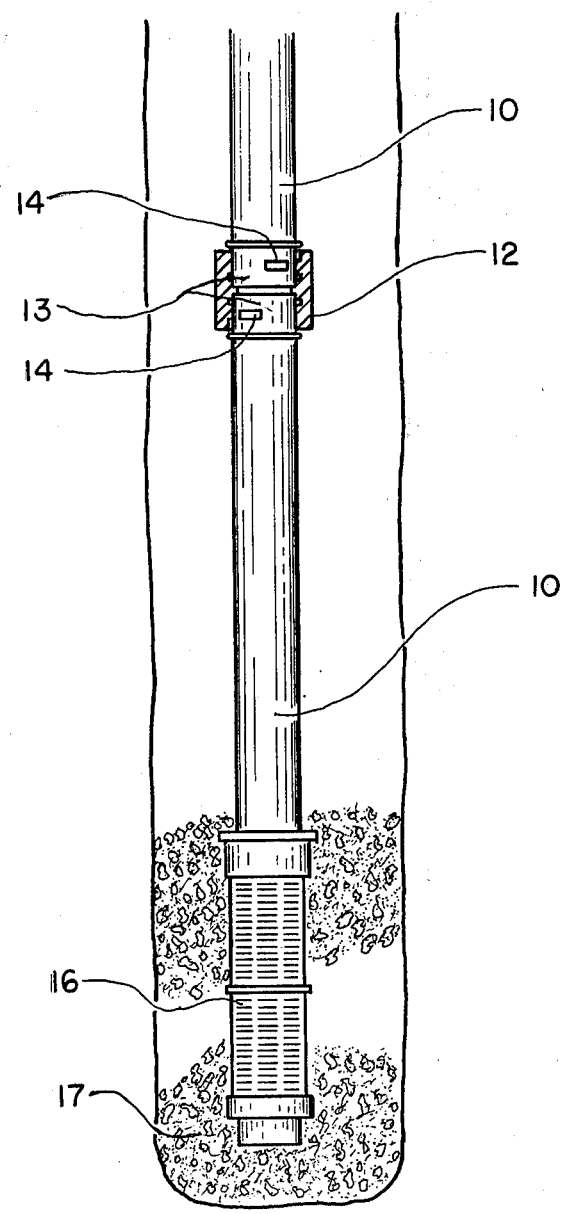
FIG. 1 shows, somewhat schematically, the bottom portion of a typical well structure with a well screen and an upwardly extending casing, with two sections of casing being joined together by a union, both the union and well screen being made in accordance with the invention.

FIG. 1 illustrates, in somewhat schematic representation, the bottom portion of a typical well casing employing certain of the fittings made in accordance with the invention. Typically, the casing comprises a string of pipe sections 10 that are made from a synthetic polymeric material, commonly rigid PVC. The sections 10 are normally of the same length, usually on the order of twenty feet. In the preferred arrangement, the pipe sections are secured together by means of a fitting or coupling 12 that comprises a hollow, cylindrical body having opposed openings for receiving the ends of adjacent pipe sections. In the construction illustrated, each of the pipe sections 10 to be drawn together by coupling 12 includes male fittings 13 that include a plurality of raised lugs 14. The lugs are received in complementary cam-type lug slots formed in the side walls of the coupling 12 and the pipe sections are secured in the coupling by relative rotation of one with respect to another. A particular advantage of this construction is that the well casing can be assembled very quickly especially if interlocking fittings are attached to the pipe sections, as by solvent or other plastic welding techniques, prior to use on the job site. For example, typical residential or municipal wells that range from eighty to one thousand feet can be cased in the order of twenty to thirty minutes time. In addition, such a system provides instantaneous locking of the casing sections together so that the joints between sections are immediately capable of withstanding substantial tensile stress.

Also, as is more or less typical, the casing includes a well screen 16 disposed at the bottom of the casing for allowing water, or whatever other liquid is being drawn from the well, to enter the casing. The desirable characteristic of the well screen is that it permits the required flow of the liquid into the interior of the casing and yet that it screen out a substantial portion of the particulates, such as sand, that are carried by the liquid. It is common practice to secure a well screen in place at the bottom of the well by forming a pack of gravel 17 around the well screen.

While the well screen is being shown in FIG. 1 at the bottom of the well, it should be realized that such well screens may also be included at intermediate positions in the casing, in those wells that pass through several water-bearing strata. In the preferred embodiment, the well screens are secured to the casing by locking-type coupling arrangements such as the type previously described in connection with coupling 12.

Figure 2:
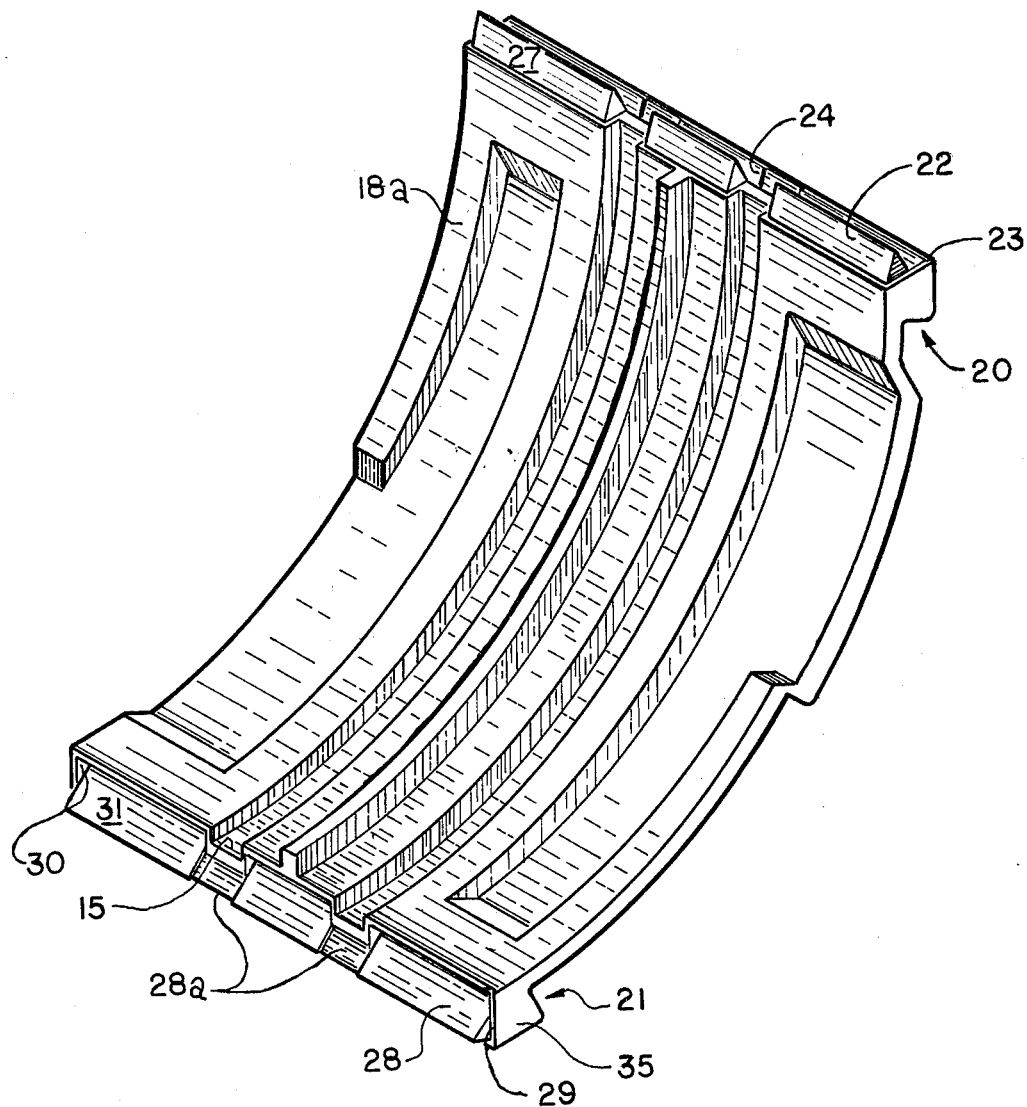
FIG. 2 is an isometric view of one section of a typical fitting made in accordance with the invention.
Figure 3:
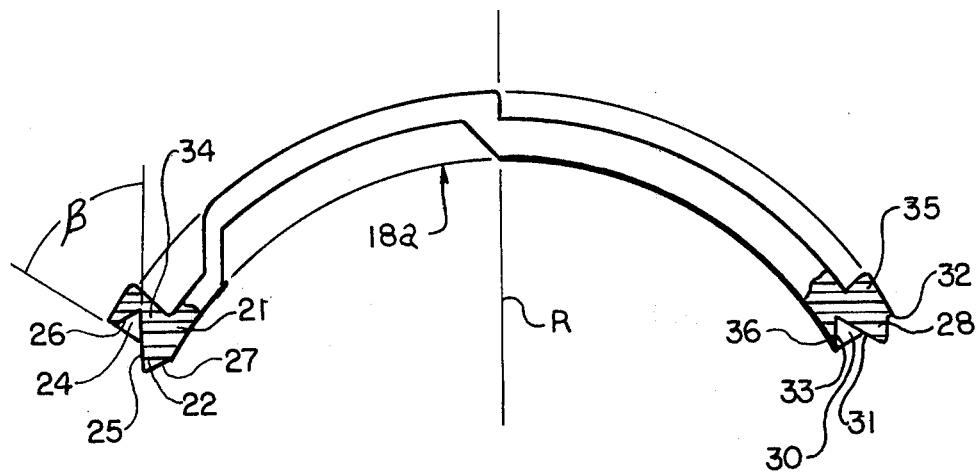
FIG. 3 is a cross-sectional view taken along line 3—3 of FIG. 2.

Referring to FIGS. 2 and 3, there is shown one section 18a of a typical fitting or coupling that employs the features of the invention. Preferably, the section is formed by injection molding a synthetic resin, for example, rigid PVC, polyolefins, polyamides, styrenes and styrene copolymers, etc. The section includes interfitting means that are disposed along the side surfaces of the section and that are designed to interfit with corresponding means on the side surfaces of the two adjoining sections, as will hereafter be described. The interfitting means comprise a lead portion 20 and a receiving portion 21 having raised ridges 22 and 28 of generally triangular cross-section, respectively, that extend longitudinally along the side surfaces 23 and 29 of the section 18a. In the lead portion 20, the raised ridge is disposed adjacent the inner edge of the surface 23. Adjacent the ridge 22 is a recess or groove 24 of substantially triangular cross-section that is parallel to the ridge 22. The ridge 22 and groove 24 form three contiguous locking surfaces: a continuous intermediate surface 25, an outer end surface 26 and an inner end surface 27 (FIG. 3). In the preferred embodiment, the end surfaces 26 and 27 are substantially parallel.

The receiving portion 21 of the interfitting means includes structure similar to that previously described except that the positions are interchanged. Thus, the receiving portion 21 includes a ridge 28 adjacent the outer edge of the surface 29 and a similarly shaped groove 30 located adjacent the inner edge of the surface 29. This arrangement also includes three contiguous locking surfaces: a continuous intermediate surface 31, an outer end surface 32, and an inner end surface 33, with the end surfaces 32 and 33 being substantially parallel in the preferred embodiment.

With reference to FIGS. 2 and 3, it should be noted that the surfaces 23 and 29 extend from the inner surface of the section beyond the outer wall of the section onto raised portions 34 and 35, respectively.

With particular reference to FIG. 3, an important feature of the arrangement shown is that the surfaces 25, 33 and 32 are all substantially parallel to the radial plane R that passes through the center of curvature of the section and that essentially bisects the section. By reason of this construction, the section can be molded in a simple two-part mold, the surfaces 25, 32 and 33 being parallel to the direction of relative movement between the male mold member and the female mold member. Thus, the section can be removed from the mold parts without substantial deformation that might interfere with obtaining circularity of the assembled fitting.

It has also been found advantageous to have the intermediate surface 25 at an angle $\beta$ that is a negative 60° with respect to the plane of the surface 23 (FIG. 2), which is a radial plane that passes through the center of curvature of the section. This has been found to yield maximum locking effect and positioning effect when the sections are assembled. Also, in the preferred form, the apex angles of each of the ridges 22 and 28 and grooves 24 and 30 is substantially 60°.

Figure 4:
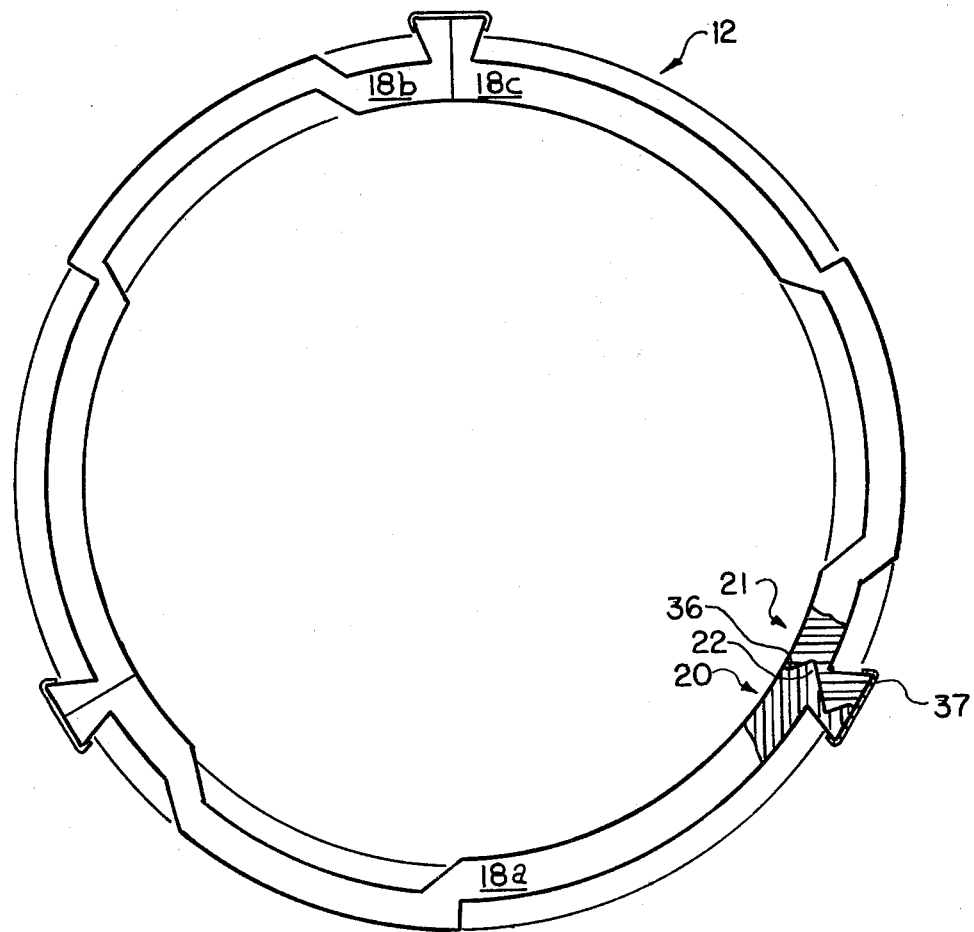
FIG. 4 is an end view of an assembled fitting comprising three of the sections as illustrated in FIGS. 2 and 3.

FIG. 4 shows a completed fitting that comprises three identical sections 18a, 18b and 18c. The sections 18a, 18b and 18c form 120° segments of the circular coupling 12.

An important feature of the interfitting means is that the receiving portion 21 includes a part that is capable of deflecting inwardly of the fitting so that the mating parts can be drawn up tightly with a minimum of separation between them. In the fragmentary cross-sectional views of the joint parts shown in FIGS. 3 and 4, the flange portion 36 is relatively thin so that when the portions 20 and 21 are drawn together, the flange portion 36 can be deflected inwardly by the ridge 22, thereby allowing the sections to be drawn together without a substantial gap between the sections along the interior surface of the coupling. This occurs because there is a substantial cross-section of material behind the surface 27 that is relatively unyielding as it engages the opposing surface 33, while, as noted, there is a relatively small cross-section of material between surface 33 and the inner surface of the section. Thus, it is the flange portion 36 that is displaced and this is believed to allow the sections to draw more closely together, thereby avoiding gaps between the sections of the assembled fitting.

It should be further noted that the disclosed interlocking system provides a "policing" function when the sections are assembled to aid in keeping the sections in proper relationship one to the other and to aid in achieving a round configuration and to hold that configuration. Also, the angularly related surfaces 25, 26, 27 and 31, 32, 33 form a substantially Z-shaped joint line between the sections. Such a shape aids in achieving a reliable bonding of the sections by solvent welding techniques because the respective mating surfaces of the joint line, especially surfaces 25 and 31, wipe across each other; this results in the joint becoming stronger than the surrounding material.

As previously noted, in connection with FIG. 3 and also as shown in FIG. 4, the portions 34 and 35 extend beyond the outer surface of the coupling. These portions can be configured so that they can be utilized in conjunction with additional locking means, either to hold newly assembled sections together during manufacture or to provide additional strength to the joints so that the fitting can be used under high pressure conditions. This locking can be achieved by securing a locking element, such as the C-shaped clamp 37, over the portions 34 and 35 so as to hold the leading and receiving portions 20 and 21 together under a clamping force. Such a clamp 37 can comprise, for example, an extruded length PVC that is slipped onto or snapped over the portions 34 and 35.

Referring again to FIG. 2, it should be noted that the raised ridges 22 and 28 and grooves 24 and 30 do not extend the full length of each of the surfaces 23 and 29, but rather terminate a short distance from the ends of each of these surfaces. This arrangement provides longitudinal alignment of the sections as they are assembled.

The fitting illustrated in FIGS. 2-4 includes radially outwardly extending channels 15 for receiving a gasket for providing a fluid seal between the fitting and the pipe ends received in the fitting. In order to ensure that there is substantially no gap in the channel at the joints between sections, it has been found desirable to include relief sections 28a (FIG. 2) on the order of 0.005 inch in the portions of the ridge 28 that are aligned with the channels.

Figure 5:
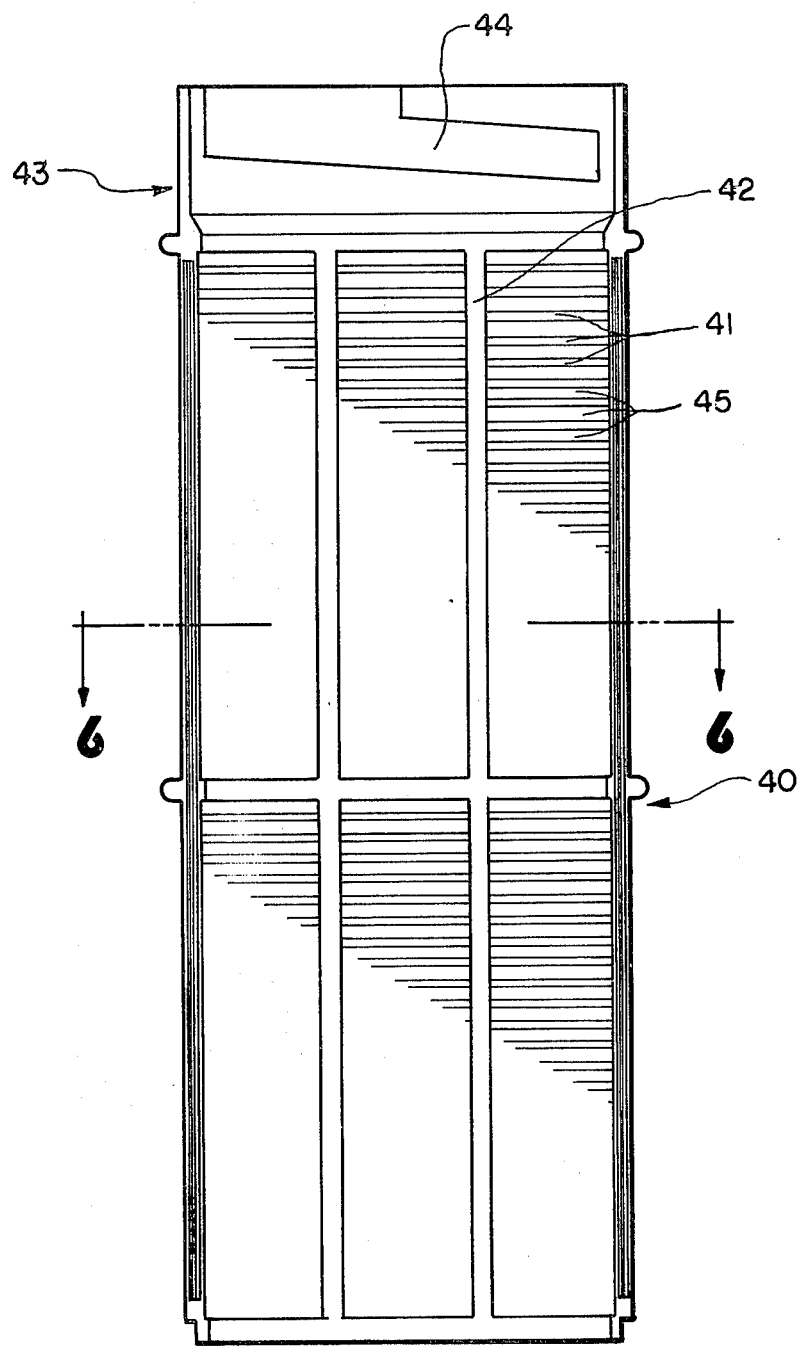
FIG. 5 is an elevational view of a section of a well screen incorporating the features of the invention.

Turning to FIG. 5, there is shown one section 40 of a well screen that incorporates the features of the invention. The section also is preferably formed of an injection-molded synthetic polymer, such as a rigid PVC. As with the fitting previously described, a completed well screen is assembled from three identical molded sections of 120° arcuate extent.

Figure 6:
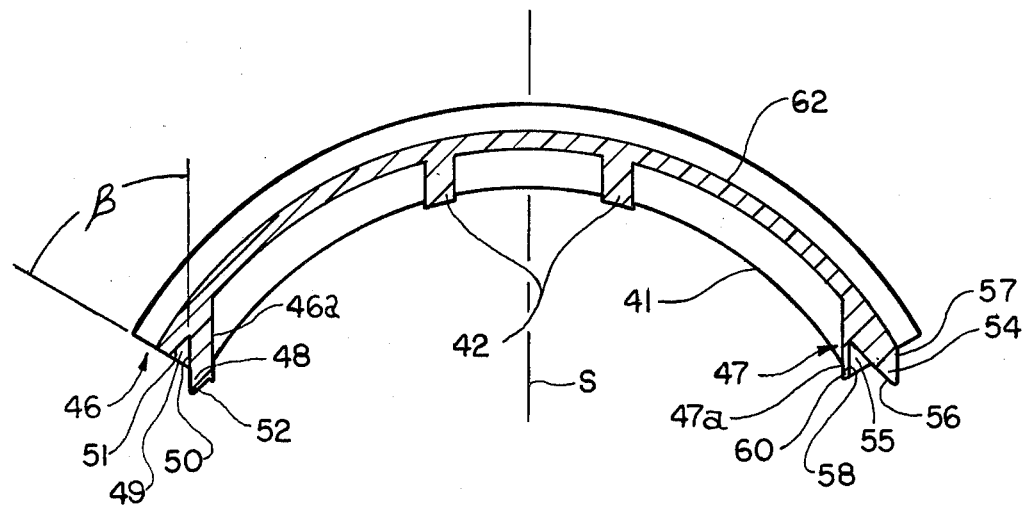
FIG. 6 is a cross-sectional view of the well screen section shown in FIG. 5.

The well screen sections include a plurality of transverse, radially inwardly extending ribs 41. Sections 40 also include one or more longitudinally extending ribs 42, the number depending upon the diameter of the screen and the desired strength. The ribs 42 extend inwardly, preferably extending beyond the transverse ribs 41. In this manner, the longitudinal ribs lessen the likelihood of damage to the transverse ribs 41 when a body, for example, a pump, is passed through the interior of the well screen. Referring to FIG. 6, it should be further noted that the longitudinal ribs 42 extend inwardly along lines generally parallel to a radially bisecting plane S that passes through the center of curvature of the section, for purposes as will hereafter be explained.

Referring again to FIG. 5, the well screen section can include fitting sections that are integrally molded as a part of the body section. Such fitting sections can comprise, for example, the section 43 that includes a lug locking slot 44 that is designed to receive a complementary locking lug on a section of the casing that is to be secured to the well screen. Such fitting sections can be integrally formed on one or both ends of each of the well screen sections 40.

The transverse ribs 41 are tapered slightly so that the grooves 45 formed between adjacent transverse ribs taper outwardly from the land of the groove to the top portion thereof. This is done so that sand particles that pass through the screen are free to continue into the interior of the well screen and do not clog the flow path for fluid materials into the well screen.

In connection with FIG. 6, it should further be noted that, as described previously in connection with the fitting in FIGS. 2-4, each section includes interfitting means located along the side surfaces of the section that are adapted to be joined to corresponding surfaces of adjacent sections. Thus, the section 40 includes a lead portion 46 and a receiving portion 47 that include means defining a Z-shaped locking surface. This means comprises, on lead portion 46, a raised ridge 48 and a contiguous groove 49, both of triangular cross-section, that form the Z-shaped surface that comprises the continuous intermediate surface 50, outer end surface 51 and inner end surface 52. Similarly, the receiving portion 47 includes a raised ridge 54 and a contiguous groove 55, again, both of triangular cross-section that form a Z-shaped locking surface comprising a continuous intermediate portion or surface 56, outer end surface 57 and inner end surface 58. Thus, the inner fitting portions are very similar to the interfitting portions previously described in connection with the fittings illustrated in FIGS. 2-4 wherein the raised ridge 48 of the lead portion 46 is disposed adjacent the interior of the well screen section and the raised rib 54 of the receiving portion 47 is disposed adjacent the exterior surface of the section. In this arrangement, the intermediate surface 50 is disposed at a negative angle $\beta$ of substantially 60° and the apex angle of the ridges 48 and 54 and grooves 49 and 55 are also approximately 60°. As previously noted, this produces a joint geometry that enhances the alignment and drawing together of the three sections that form the completed well screen.

It should be further noted that the section 40 can be molded in a simple two-part mold and this is accomplished by having the surfaces 50, 57 and 58 of the locking arrangements and the surfaces 46a and 47a of the interfitting means, and also the ribs 42, substantially parallel to the plane S that bisects the section and passes through its center of curvature, so that all of these surfaces or parts are substantially parallel to the direction of movement of the movable mold part with respect to the fixed mold part. This results in a configuration that can be formed in simple two-piece molds that allow removal of the newly formed section without distortion.

Figure 7:
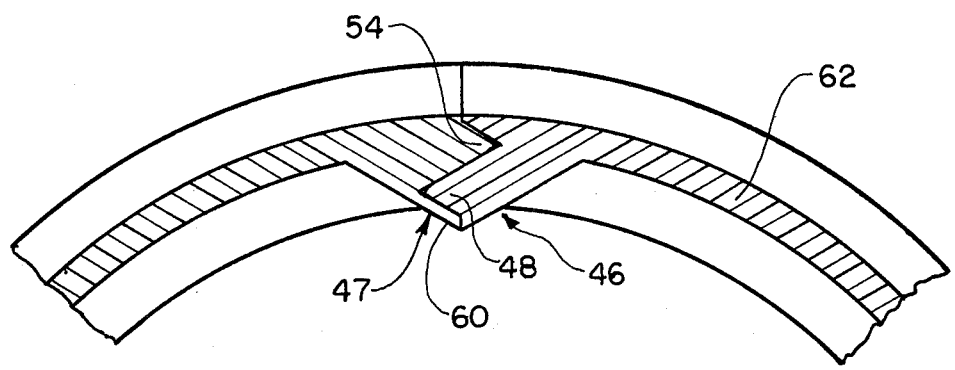
FIG. 7 is a fragmentary view of the interfitting edge portions of the well screen sections shown in FIGS. 5 and 6.

The interfitting arrangement of the well screen sections, in its preferred form, is shown in the fragmentary cross-sectional view in FIG. 7 and differs slightly from the interfitting system for the fitting shown in FIGS. 2-4 in essentially one particular, this being that a portion of the leading section 46 and a portion of the receiving section 47 extend radially inwardly. This results in two advantages: the exterior skin of the well screen is a continuous, curvilinear surface without projections, even in the region of the joints between sections, and the material that extends inwardly of the outer shell of the sections forms a longitudinally extending rib that serves to increase the crush resistance of the screen. As can be seen in FIG. 7, the longitudinal rib formed by the portions 46 and 47 extends radially inwardly beyond the transverse ribs 41, thereby serving to protect the transverse ribs 41, much like the longitudinally extending ribs 42.

Again referring to FIG. 7, it should be realized that this fitting assembly includes a deflecting portion 60 that is of relatively thin cross-section and that is capable of being deflected inwardly as the portion of leading portion 46 interfits with the groove 55. This allows a snug fit of the pieces with substantially no gaps, as previously discussed in connection with the fitting of FIGS. 2-4.

Referring especially to FIG. 6, it should be noted that when the molded section 40 is released from the mold parts, there is a continuous skin or land section 62 that forms the outer surface of the section. The skin 40 is preferably relatively thin, for example, on the order of 0.100 inch. In order to render the section foraminous, slits are cut through the skin 62 by saw blades that cut through the skin 62 in the regions between the transversely extending ribs 41. This cutting operation can take place before or after the three sections have been assembled and proceeds from the exterior of the skin 62 inwardly. An advantage of this method is that a single type of mold parts, for example, for a five-inch diameter well screen, can serve to form well screens having a wide variety of flow rates and filtering capabilities. These flow rates and filtering capabilities are determined by the width of the slits cut through the skin 62.

Figure 8:
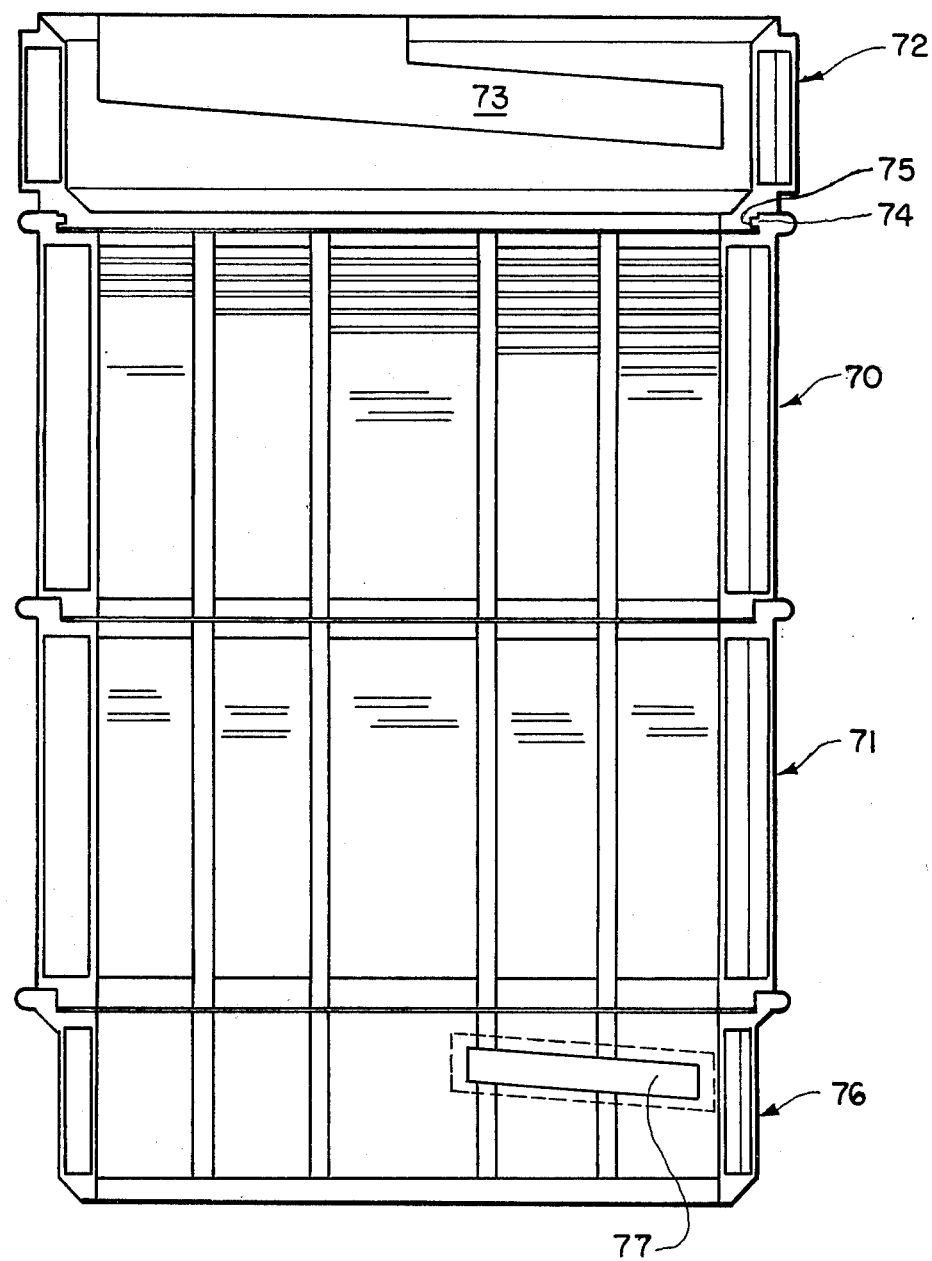
FIG. 8 shows another form of well screen section employing a plurality of sections arranged in end-to-end relationship.

Referring to FIG. 8, there is shown another form of well screen incorporating features of the invention. This form is designed primarily for use with large diameter casings. The sections of the screen are assembled in the same manner as previously described in connection with the well screen of FIG. 5, there being three identical sections that are assembled to form a completed unit. However, in larger diameter applications, it has been found desirable to increase the flexibility of the system by providing for interfitting of any desired number of well screen sections to accommodate the particular need of the user. Thus, as illustrated in the example of FIG. 8, the well screen comprises two screen sections 70 and 71 that are joined together, as by solvent welding, along an interfitting transverse joint. Thus, well screen sections can be fabricated in any desired length merely by securing the desired number of well screen sections together.

Also, it may be desirable to form the fitting sections of the well screen of separate parts that can be assembled to the screen to attach the screen to the well casing or to another screen. In the FIG. 8 arrangement, there is a cam slot section 72 that is formed of three identical segments, as previously described. Each of the segments includes a locking element, for example, a cam slot 73. The section 72 is secured to the screen body formed by sections 70 and 71 by means of, for example, a bayonet-type arrangement that includes lugs 74 on the well screen section that engage corresponding locking slot 75 on the fitting piece 72. It is usually desirable to further ensure the integrity of the joint by solvent welding of the pieces together.

The other end of the well screen can include a spigot section 76 that is also formed of three identical interfitting sections of the type that is previously described. The spigot section 76 can include suitable locking means, for example, locking lugs 77 that are to be received in a corresponding locking groove in a fitting that is associated with an adjoining section of the casing.

Substantial advantages are exhibited by well screens fabricated in the foregoing manner. They have exceptional crush resistance because the transverse and longitudinal ribs act in the same fashion as I-beams to resist crushing forces. In addition, such well screens have withstood rotational jet cleaning without damage. Further, the manufacturing costs of such well screens are believed to be less than one-half the cost of wound wire screens having comparable specifications.

We claim:

1. A method of manufacturing a well screen, comprising:
    injection molding from synthetic resinous material a curved section of the screen having a transverse extent of substantially 120° and with a plurality of integrally formed, inwardly extending radial ribs and an exterior continuous skin and including interfitting means disposed along the side surfaces of the sections that are designed to interfit with corresponding means on the side surfaces of two adjoining sections so that three sections can be interlocked to form a round configuration when drawn up tightly;
    interfitting longitudinal side surfaces of three of the curved sections to form a substantially circular screen;
    drawing mating side surfaces tightly together and welding them to interlock said sections; and
    forming apertures of predetermined size in the skin in regions bounded by the radial ribs.

2. A method as in claim 1 wherein the apertures are formed by cutting the skin with saw blades.

3. A method as in claim 2 wherein cutting is initiated on the exterior surface of the skin.

4. A method of manufacturing a well screen, comprising:
    injection molding from synthetic resinous material a curved section of the screen having a transverse extent of substantially 120° and with a plurality of integrally formed, inwardly extending radial ribs and an exterior continuous skin and including interfitting means disposed along the side surfaces of the sections that are designed to interfit with corresponding means on the side surfaces of two adjoining sections so that three sections can be interlocked to form a round configuration when drawn up tightly;
    forming apertures of predetermined size in the skin in regions bounded by the radial ribs;
    then interfitting longitudinal side surfaces of three of the curved sections to form a substantially circular screen; and
    drawing mating side surfaces tightly together and welding them to interlock said sections.

* * * * *